3,355,410
SOLUTION POLYMERIZATION OF ACRYLONITRILE USING A CATALYST SYSTEM COMPRISING AN OXIDIZING AGENT AND SILVER, VANADIUM OR RHODIUM AND SALTS THEREOF
Clarence C. Dannelly and John R. Caldwell, Kingsport, Tenn., assignors to Eastman Kodak Company, Rochester, N.Y., a corporation of New Jersey
No Drawing. Continuation of application Ser. No. 270,195, Apr. 3, 1963. This application Oct. 22, 1965, Ser. No. 502,400
32 Claims. (Cl. 260—30.4)

This application is a continuation of Ser. No. 270,195 filed on Apr. 3, 1963, in the name of Clarence C. Dannelly and John R. Caldwell, now abandoned.

This invention relates to a new and improved polymerization process for preparing resinous polymers of acrylonitrile, and more particularly to the preparation of polyacrylonitrile and copolymers containing at least 50% by weight of acrylonitrile, employing a specific catalyst system in an organic liquid which is a solvent for the polymer.

The new process of the invention has many advantages among which is that the polymer is obtained as a solution suitable for direct spinning to fibers and filaments or direct forming to films, sheets and other shaped articles. This capability eliminates many laborious and time-consuming steps as compared, for example, to prior processes employing aqueous or other nonsolvent reaction media wherein is involved (1) precipitation of emulsified polymer, (2) filtering and washing of polymer cake, (3) drying polymer, (4) dissolving the polymer and (5) filtering the polymer solution before the final product can be used.

Particularly important to the present invention is the catalyst system employed therein. We have found that silver, vanadium, and rhodium containing catalysts are highly efficacious in combination with certain oxidizing agents for the solution polymerization of acrylonitrile. This group consists of the finely divided metals and the various salts of these metals. The presence of this catalyst system permits the polymerization reaction with acrylonitrile to be carried out smoothly to high molecular weight products at relatively low temperatures and in a minimum period of time. This is in marked contrast to previously known processes which produce polymers of acrylonitrile in solvents for the polymer wherein relatively long reaction periods are necessary and the resulting polymers are obtained as low yields of low molecular weight polymer which are frequently undesirably colored. The problems and descriptions of the products of polymerization of acrylonitrile in solution with customary catalysts are discussed in several publications. For example, W. M. Thomas et al. have reported in Journal of Polymer Science, 17, 275 (1955) that the polymerization of acrylonitrile in ethylene carbonate and in dimethylformamide, using azobis-(butyronitrile) as the catalyst, resulted in polymer yields of 44% and 30%, respectively, the latter process giving a product having an intrinsic viscosity of but 0.5. This result was attributed therein to the fact that interaction had occurred with the dimethylformamide, i.e., chain transfer and retardation fully accounted for low reaction rates and the low molecular weights of the products obtained in dimethylformamide. As another example, British Patent No. 849,864 has proposed the use of ammonium persulfate as a single catalyst for polymerizing acrylonitrile in solution in dimethylformamide. However, it has been found that the process of this patent is not wholly satisfactory for commercial operation because of the necessity of using a temperature of 50° C. or above and for times in excess of 35 hours. The process of the invention does not have these limitations. The process of the invention actually gives better than 85% yield of polymer when using temperatures in the preferred range of about from 20–50° C., in a period of only from 2.5–4 hours. The polymer obtained is essentially colorless and the molecular weights are controllable and intrinsic viscosity values can be obtained, as desired, in the range of from 0.5–2.5. These important advantages of the process of the invention are believed to be due to the presence of both the metal or metal ions and the oxidizing agent.

Another important advantage of the process of the invention is that the presence of the mentioned metals and salts thereof as catalysts permits the reduction of the amount of oxidizing agent and in the total amount of catalyst residues in the final polymeric article. This reduction in residues is important because larger amounts of residual salts must be removed by filtration of the polymer which in a practical process adds to the time and expense of processing the polymer.

Objects of the invention, therefore, are: to provide an improved process for polymerizing acrylonitrile in an organic liquid which is a solvent for the polymer; to provide a new catalyst combination for accelerating the polymerization reaction; and to provide a solvent polymerization process for acrylonitrile that produces polymers having relatively high molecular weights and low catalyst residues, which polymers can be directly processed to fibers and films without costly purification and separation steps. Other objects will become apparent from the following description and claims.

In accordance with the invention, the polymerizations of acrylonitrile alone or together with comonomers may be carried out with certain preferred procedures. One general method of practicing the invention consists of mixing or dissolving acrylonitrile monomer in organic liquids which are good solvents for polyacrylonitrile, for example, N,N-dimethylformamide, N,N-dimethylacetamide, γ-butyrolactone, ethylene carbanoate and dimethylsulfoxide, as well as in various mixtures of these solvents with each other in any proportions, and in mixtures of these solvents with up to 25% of other solvents such as lower alkanols, ketones, hydrocarbons and in particular acetonitrile. Particularly effective in the present invention are such solvent systems which are comprised mainly of ethylene carbonate, preferably at least about 80% by volume thereof. The relative proportion of monomer to solvent is advantageously in the range of from 5–60% of acrylonitrile, based on the total weight of the mixture. The usual and preferred range is from 10–40% monomer. The preferred solvent for the process of the invention is N,N-dimethylformamide, which produces very satisfactory polymer solutions of both polyacrylonitrile and the copolymers of acrylonitrile, for example, with alkyl acrylates and methacrylates. A fine dispersion of the metal or a salt of silver, vanadium, or rhodium is then added to the mixture. Suitable silver salts include $AgNO_3$, $Ag_2SO_4$, silver alkyl sulfates, silver salts of aliphatic or aromatic carboxylic or sulfonic acids, Ag₃PO₄ and acid phosphates such as AgH₂PO₄, and amine complexes made by reacting various aliphatic amines with a silver salt or silver oxide. Suitable vanadium salts include the tri and tetra valent halides, $VSO_4$—$7H_2O$, $VOSO_4$, $V_2O_3$, $VOCl_2$ and $VOBr_2$. Suitable rhodium salts include rhodium nitrate, rhodium sulfate, rhodium salts with aliphatic or aromatic carboxylic or sulfonic acids, rhodium phosphate, rhodium oxide or hydroxide. The salt or metal need not be soluble in the reaction mixture for the process to be operable. The useful range of the metal or salt is about from 0.0001–3.0%, preferably from 0.001–1.0%, based on the weight of the monomer. This mixture is stirred under an inert atmosphere, for example, nitrogen and an oxidizing agent is added. The preferred oxidizing agents are the salts and acids of peroxysulfuric acid. These include Caro's acid ($H_2SO_5$) or monoperoxysulfuric acid, peroxydisulfuric acid, the ammonium and alkali-metal salts such as, for example, ammonium, potassium or sodium persulfate, etc., and sulfur tetroxide which, under certain conditions of low temperature and traces of water, reacts to give a suitable oxidizing agent. However, the preferred specific oxidizing agent is potassium persulfate. In some instances, the oxidizing agent can advantageously be made in the reaction mixture, for example, using sulfuric acid and hydrogen peroxide to generate Caro's acid. The quantity of the oxidizing agent used can be varied in accordance with the desired reaction rate, the characteristics of the oxidizing agent and the desired molecular weight of the resultant polymer. The desired range is based on the peroxy oxygen (—O—O—) which is apparently available in the formulas of Caro's acid and sulfodiperacid. The useful range of the oxidizing agent is about from 0.025–2.0%, based on the monomer weight.

The final mixture is then stirred under nitrogen at temperatures in the range of from −70 to 100° C., but preferably in the range of from 20–50° C. Depending on the temperature, the amount of catalyst used, and to a slight extent on the solvent, a high yield of polyacrylonitrile forms in a period of from 0.5–24 hours. In the preferred temperature and catalyst ranges, the time for substantially complete polymerizattion of the monomer requires only from about 2.5–4 hours. Under some lowered temperature conditions, the newly formed polymer may not be soluble as formed but dissolves on heating to normal temperatures, for example, if the polymerization is done in N,N-dimethylformamide below 30° C. The polymer readily dissolves on heating the mixture to 40° C. Depending on the solvent and the desired procedure, the solutions prepared as above described are then shaped into films or fibers by solvent evaporation or extraction using specific techniques known to the art.

It is particularly noteworthy that the present invention utilizes a non-aqueous, organic solvent system in which, quite unexpectedly, the present catalysts function. In this regard, the mechanism of such catalysts in aqueous media appear to function by way of hydroxyl radicals as the active component. The mechanism involved in the present solvent system however, is entirely different and not apparent from the aforesaid aqueous mechanism.

Another method of practicing the present invention is to use the processes and materials above described for the preparation of polyacrylonitrile to make useful copolymers of acrylonitrile. The only difference from the foregoing procedure is that the starting monomers are mixtures of acrylonitrile and one or more other monoethylenically unsaturated, polymerizable compounds or comonomers containing a —CH=C< group, and more especially a $CH_2$=C< group. Suitable comonomers include vinyl, isopropenyl and allyl esters of carboxylic acids containing from 2–7 carbon atoms, e.g., vinyl acetate, vinyl propionate, vinyl butyrate, vinyl benzoate, etc., and the corresponding isopropenyl and allyl esters, allyl alcohol, alkyl acrylates and methacrylates wherein the alkyl group contains from 1 to 10 carbon atoms, e.g., methyl acrylate, ethyl acrylate, butyl acrylate, tertiary butyl acrylate, hexyl acrylate, decyl acrylate, etc., and the corresponding methacrylates, alicyclic acrylates and methacrylates wherein the alicyclic group contains 5–8 or more carbon atoms, e.g., cyclopentyl acrylate, cyclohexyl acrylate, 2-norcamphanyl methacrylate, etc., vinyl halides, e.g., vinyl chloride, vinyl bromide and vinyl fluoride, vinylidene halides, e.g., vinylidene chloride, vinylidene bromide, vinylidene chloridebromide, vinylidene fluoride, etc., acrylamide, methacrylamide, N-alkyl substituted acrylamides and methacrylamides wherein the alkyl groups contain from 1–4 carbon atoms, e.g., N-methyl acrylamide, N-isopropylacrylamide, N-butylacrylamide, N,N-dimethylacrylamide, N,N-diisopropylacrylamide, etc., and the corresponding methacrylamides, methacrylonitrile, styrenes, e.g., styrene, α-methylstyrene, α-acetoxystyrene, p-methylstyrene, p-acetaminostyrene, etc., vinyl pyridines, e.g., 2-vinylpyridine, 4-vinylpyridine, etc., N-vinyl lactams, e.g., N-vinyl pyrrolidone, etc., acrylic acid, methacrylic acid, α-chloroacrylic acid and salts of these acids, cyclic imides, e.g., vinyl succinimide, vinyl phthalimide, etc., vinyl alkyl ketones, vinyl alkyl ethers, N-vinyl alkyl urethanes wherein in each instance the alkyl group contains from 1–4 carbon atoms, e.g., vinyl methyl ketone, vinyl ethyl ketone, vinyl butyl ketone, vinyl methyl ether, vinyl butyl ether, N-vinyl ethylurethane, N-vinyl butylurethane, etc., vinyl sulfonamides, e.g., vinyl sulfonamides, e.g., vinyl sulfonamide, N-vinyl methyl sulfonamide, N-vinyl butyl sulfonamide, etc., vinylsulfonic acid, allyl sulfonic acid, and alkali metal salts of these acids such as sodium salt of vinylsulfonic acid, etc., the unsaturated acid sulfates and phosphates, e.g., sodium allyl sulfate, disodium allyl phosphate, and other groups of this nature that are known to impart affinity for basic dyes, maleic, fumaric itaconic and citraconic acids, dialkyl maleates, fumarates, itaconates, citraconates wherein the alkyl group in each instance contains from 1 to 4 carbon atoms, e.g., dimethyl maleate, dibutyl fumarate, etc., amides and ester-amides such as fumaramide, maleamide, itaconamide, N-methyl fumaramide, N,N'-diethyl fumaramide, etc., fumaramates, maleamates, itaconamates, citraconamates, ethylene, isobutylene, propylene, and the like. The proportion of comonomer can have any value up to 50% by weight of the monomeric mixture, the remainder being acrylonitrile. However, the preferred proportions are from about 70 to 95% by weight of acrylonitrile and from 30 to 5% by weight of the comonomer. Thus, the process of the invention has an overall scope of proportions of from 50 to 100% of acrylonitrile and from 50 to 0% by weight, i.e., up to 50%, of at least one other polymerizable monomer. In general, the proportions of the substituents in the copolymers are the same as in the starting polymerization reaction mixtures.

The process of the invention can also be carried out with advantage by including various additives in the polymerization mixtures. Chain transfer agents such as phenols and alkyl mercaptans may be added in amounts of from 0.01–2.0% based on the weight of monomer. Pigments for delustering or for coloring fibers and films can be added before polymerization or just before spinning or casting. The process can also be operated in continuous manner wherein the ingredients are added continuously and the resulting polymer solution is continuously withdrawn from the system.

Preferably, normal atmospheric pressures are used, but lower or higher than atmospheric pressures also are operable and can be employed, if desired.

The following examples serve further to illustrate the manner of practicing the process of the invention.

*Example No. 1*

One hundred grams of acrylonitrile was mixed with 300 ml. of ethylene carbonate at 35° C. Ten milligrams of silver acetate and 0.75 g. of potassium persulfate was added and the mixture was stirred under a nitrogen atmosphere for 4 hr. At this time the composition of the resultant viscous solution was found to be 97 g. of polyacrylonitrile with an intrinsic viscosity of 2.65. This solution was clear and substantially colorless. Fibers were made using a wet-spinning procedure. These fibers were nearly white and had a tensile strength of 4.10 g./den.

Example No. 2

One hundred grams of acrylonitrile was mixed with 300 ml. of N,N-dimethylformamide at 45° C. Forty milligrams of silver nitrate and 1.5 g. of potassium persulfate was added and the mixture was stirred for 5 hr. under a nitrogen atmosphere. A viscous solution was the result at this time and analysis showed a 92.3% conversion of the acrylonitrile monomer to polymer. This solution was clear and substantially colorless. Fibers were spun from this solution by extruding the solution into a heated chamber. The resulting fibers were drafted and heat-set. The properties of these fibers are listed in the following table:

| | |
|---|---|
| Color | Essentially white |
| Strength, g./den. | 3.88 |
| Denier | 10 |
| Elongation, percent | 16.3 |
| Sticking temp., ° C. | 235–242 |
| Flow point, ° C. | 210–220 |

Example No. 3

Three hundred grams of acrylonitrile was polymerized in 900 ml. of N,N-dimethylformamide using 120 mg. of silver nitrate, 4.5 g. of potassium persulfate, and the condition described in Example 2. The resulting viscous solution was divided into two parts. One part was converted to fibers by a wet-spinning technique. The fibers had the following properties:

| | |
|---|---|
| Color | White |
| Strength, g./den. | 4.3 |
| Denier | 4 |
| Elongation, percent | 14.2 |
| Sticking temp., ° C. | 233–238 |
| Flow point, ° C. | 220–225 |

The remaining portion of the solution was converted into films of polyacrylonitrile by spreading the solution in metal plates at 80–150° C. These films were colorless or had a very light straw color. The films could be drafted to give tough, flexible films.

Example No. 4

Ninety-three grams of acrylonitrile, 7 g. of methyl acrylate, and 300 ml. of dimethyl sulfoxide was mixed at 20° C. Five milligrams of silver acetate and 0.75 g. of Caro's acid ($H_2SO_5$) was added and the mixture was stirred under a nitrogen atmosphere for 3.5 hr. After this time a viscous solution was observed to contain 97.5 g. of polymer having an intrinsic viscosity of 2.68. The solution was essentially colorless and could be converted into films or fibers by solvent extraction using water or mixtures of water and water-miscible organic liquids.

Example No. 5

Using the technique described in Example 4, the same polymer composition was prepared in γ-butyrolactone. This polymer had similar properties and could be converted to films and fibers by the same method.

Example No. 6

Ninety-three grams of acrylonitrile, 7 g. of ethyl acrylate, and 400 ml. of ethylene carbonate was mixed together. One gram of finely divided titanium dioxide, 0.5 g. of t-dodecylmercaptan, 25 mg. of silver acetate, and 0.75 g. of potassium persulfate was added and this mixture was then stirred under a nitrogen atmosphere for 4.5 hr. After this time analysis showed a 96.5% conversion of the monomers to polymer which had the composition 93% acrylonitrile and 7% ethyl acrylate units.

Example No. 7

Eighty grams of acrylonitrile, 20 g. of N,N-dimethylacrylamide, and 300 g. of N,N-dimethylacetamide was mixed together. One gram of finely divided titanium dioxide, 10 mg. of silver acetate, and 1.2 g. of potassium persulfate was added and this mixture was stirred for 3.5 hr. at 40° C. The resulting polymer solution was spun into fibers using a wet-spinning technique. The fibers had excellent strength properties and dyed well with acetate and acid wool dyes.

Example No. 8

Ninety-three grams of acrylonitrile, 4 g. of methyl acrylate, and 3 g. of sodium allyl sulfonate was mixed with 300 ml. of ethylene carbonate which contained 16 mg. of finely divided silver metal and 0.5 g. of potassium persulfate. This mixture was stirred at 30° C. under a nitrogen atmosphere for 5 hr. A viscous solution of the terpolymer composed of 93% acrylonitrile, 4% methyl acrylate, and 3% sodium allyl sulfonate was obtained. This polymer was spun into fibers using a wet-spinning technique. These fibers dyed well with basic dyes.

Example No. 9

One hundred grams of acrylonitrile was mixed with 300 ml. of ethylene carbonate at 35° C. Ten milligrams of vanadium pentoxide and 0.75 g. of potassium persulfate was added and the mixture was stirred under a nitrogen atmosphere for 4 hr. At this time the composition of the resultant viscous solution was found to be 97 g. of polyacrylonitrile with an intrinsic viscosity of 2.65. This solution was clear and substantially colorless. Fibers were made using a wet-spinning procedure. These fibers were nearly white and had a tensile strength of 4.10 g./den.

Example No. 10

One hundred grams of acrylonitrile was mixed with 300 ml. of N,N-dimethylformamide at 45° C. Forty milligrams of vanadium pentoxide and 1.5 g. of potassium persulfate was added and the mixture was stirred for 5 hr. under a nitrogen atmosphere. A viscous solution was the result at this time and analysis showed a 92.3% conversion of the acrylonitrile monomer to polymer. This solution was clear and substantially colorless. Fibers were spun from this solution by extruding the solution into a heated chamber. The resulting fibers were drafted and heat-set. The properties of these fibers are listed in the following table.

| | |
|---|---|
| Color | Essentially white |
| Strength, g./den. | 3.88 |
| Denier | 10 |
| Elongation, percent | 16.3 |
| Sticking temp., ° C. | 235–242 |
| Flow point, ° C. | 210–220 |

Example No. 11

Three hundred grams of acrylonitrile was polymerized in 900 ml. of N,N-dimethylformamide using 120 mg. of vanadium pentoxide, 4.5 g. of potassium persulfate, and the condition described in Example 10. The resulting viscous solution was divided into two parts. One part was converted to fibers by a wet-spinning technique. The fibers had the following properties:

| | |
|---|---|
| Color | White |
| Strength, g./den. | 4.3 |
| Denier | 4 |
| Elongation, percent | 14.2 |
| Sticking temp., ° C. | 233–238 |
| Flow point, ° C. | 220–225 |

The remaining portion of the solution was converted into film of polyacrylonitrile by spreading the solution on metal plates at 80–150° C. These films were colorless or had a very light straw color. The films could be drafted to give tough, flexible films.

Example No. 12

Ninety-three grams of acrylonitrile, 7 g. of methyl acrylate, and 300 ml. of dimethyl sulfoxide were mixed at 20° C. Five milligrams of vanadium pentoxide and 0.75 g. of Caro's acid ($H_2SO_5$) were added and the mixture was stirred under a nitrogen atmosphere for 3.5 hr. After this time a viscous solution was observed to contain 97.5 g. of polymer having an intrinsic viscosity of 2.68. The solution was essentially colorless and could be converted into films or fibers by solvent extraction using water or mixtures of water and water-miscible organic liquids.

Example No. 13

Using the technique described in Example 12, the same polymer composition was prepared in γ-butyrolactone. This polymer had similar properties and could be converted to films and fibers by the same method.

Example No. 14

Ninety-three grams of acrylonitrile, 7 g. of ethyl acrylate, and 400 ml. of ethylene carbonate were mixed together. One gram of finely divided titanium dioxide, 0.5 g. of t-dodecylmercaptan, 25 mg. of vanadium pentoxide, and 0.75 g. of potassium persulfate were added and this mixture was then stirred under a nitrogen atmosphere for 4.5 hr. After this time analysis showed a 96.5% conversion of the monomers to polymer which had the composition 93% acrylonitrile and 7% ethyl acrylate units.

Example No. 15

Eighty grams of acrylonitrile, 20 g. of N,N-dimethylacrylamide, and 300 g. of N,N-dimethylacetamide were mixed together. One gram of finely divided titanium dioxide, 10 mg. of vanadium pentoxide, and 1.2 g. of potassium persulfate were added and this mixture was stirred for 3.5 hr. at 40° C. The resulting polymer solution was spun into fibers using a wet-spinning technique. The fibers had excellent strength properties and dyed well with acetate and acid wool dyes.

Example No. 16

Ninety-three grams of acrylonitrile, 4 g. of methyl acrylate, and 3 g. of sodium allyl sulfonate were mixed with 300 ml. of ethylene carbonate which contained 16 mg. of finely divided vanadium metal and 0.5 g. of potassium persulfate. This mixture was stirred at 30° C. under a nitrogen atmosphere for 5 hr. A viscous solution of the terpolymer composed of 93% acrylonitrile, 4% methyl acrylate, and 3% sodium allyl sulfonate was obtained. This polymer was spun into fibers using a wet-spinning technique. These fibers dyed well with basic dyes.

Example No. 17

One hundred grams of acrylonitrile was mixed with 300 ml. of N,N-dimethylformamide at 45° C. 40 mg. of rhodium nitrate and 1.5 g. of potassium persulfate was added and the mixture was stirred for 5 hr. under a nitrogen atmosphere. A viscous solution was the result at this time and analysis showed a 92.3% conversion of the acrylonitrile monomer to polymer. This solution was clear and substantially colorless. Fibers were spun from this solution by extruding the solution into a heated chamber. The resulting fibers were drafted and heat-set. The properties of these fibers are listed in the following table:

| | |
|---|---|
| Color | Essentially white |
| Strength, g./den. | 3.88 |
| Denier | 10 |
| Elongation, percent | 16.3 |
| Sticking temp., ° C. | 235–242 |
| Flow point, ° C. | 210–220 |

Example No. 18

Three hundred grams of acrylonitrile was polymerized in 900 ml. of N,N-dimethylformamide using 120 mg. of rhodium nitrate, 4.5 g. of potassium persulfate, and the condition described in Example 17. The resulting viscous solution was divided into two parts. One part was converted to fibers by a wet-spinning technique. The fibers had the following properties:

| | |
|---|---|
| Color | White |
| Strength, g./den. | 4.3 |
| Denier | 4 |
| Elongation, percent | 14.2 |
| Sticking temp., ° C. | 233–238 |
| Flow point, ° C. | 220–225 |

The remaining portion of the solution was converted into films of polyacrylonitrile by spreading the solution in metal plates at 80–150° C. These films were colorless or had a very light straw color. The films could be drafted to give tough, flexible films.

Example No. 19

Ninety-three grams of acrylonitrile, 7 g. of methyl acrylate, and 300 ml. of dimethyl sulfoxide were mixed at 20° C. 5 mg. of rhodium chloride and 0.75 g. of Caro's acid ($H_2SO_5$) were added and the mixture was stirred under a nitrogen atmosphere for 3.5 hr. After this time a viscous solution was observed to contain 97.5 g. of polymer having an intrinsic viscosity of 2.68. The solution was essentially colorless and could be converted into films or fibers by solvent extraction using water or mixtures of water and water-miscible organic liquids.

Example No. 20

Ninety-three grams of acrylonitrile, 7 g. of methyl acrylate, and 300 ml. of dimethyl sulfoxide was mixed at 20° C. 5 mg. of vanadium chloride and 0.75 g. of Caro's acid ($H_2SO_5$) was added and the mixture was stirred under a nitrogen atmosphere for 3.5 hr. After this time a viscous solution was observed to contain 97.5 g. of polymer having an intrinsic viscosity of 2.68. The solution was essentially colorless and could be converted into films or fibers by solvent extraction using water or mixtures of water and water-miscible organic liquids.

Example No. 21

Eighty grams of acrylonitrile, 20 g. of N,N-dimethylacrylamide, and 300 g. of N,N-dimethylacetamide was mixed together. 1 g. of finely divided titanium dioxide, 10 mg. of vanadium oxychloride, and 1.2 g. of potassium persulfate was added and this mixture was stirred for 3.5 hr. at 40° C. The resulting polymer solution was spun into fibers using a wet-spinning technique. The fibers had excellent strength properties and dyed well with acetate and acid wool dyes.

The invention has been described in detail with particular reference to preferred embodiments thereof but it will be understood that variations and modifications can be effected within the spirit and scope of the invention as described hereinabove and as defined in the appended claims.

What we claim is:
1. A process for preparing a solution of acrylonitrile polymer which can be used directly to make shaped articles which comprises polymerizing monomeric material consisting of from 50–100% by weight of acrylonitrile and up to 50% by weight to make a total of 100% of at least one other monoethylenically unsaturated, polymerizable compound containing a single $CH_2\!=\!C\!<$ group, in an organic liquid which is a solvent for polyacrylonitrile, at a temperature of from −70 to 100° C., with (1) from about 0.0001 to about 3.0% by weight based on monomer weight of a catalyst selected from the group consisting of silver, vanadium, rhodium and their salts and (2) from about 0.025 to about 2.0% based on monomer weight of an oxidizing agent selected from the group consisting of monoperoxysulfuric acid, peroxydisulfuric acid, ammonium salt of monoperoxysulfuric acid, ammonium salt of peroxydisulfuric acid, an alkali metal salt of monoperoxysulfuric acid, an alkali metal salt of peroxysulfuric acid and sulfur tetroxide in combination with water.

2. The process of claim 1 wherein the said catalyst is a silver salt.

3. The process of claim 1 wherein the said catalyst is a vanadium salt.

4. The process of claim 1 wherein the said catalyst is a rhodium salt.

5. The process of claim 1 carried out in a continuous manner.

6. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20 to 50° C., with (1) from 0.01–1.0% of silver acetate based on the weight of said monomeric material, and (2) from 0.026–2.0% of potassium persulfate based on the weight of said monomeric material.

7. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20 to 50° C., with (1) from 0.0001–1.0% of silver nitrate based on the weight of said monomeric material, and (2) from 0.026–2.0% of potassium persulfate based on the weight of said monomeric material.

8. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20 to 50° C., with (1) from 0.001–1.0% of finely divided silver metal based on the weight of said monomeric material, and (2) from 0.026–2.0% of potassium persulfate based on the weight of said monomeric material.

9. A process for preparing a solution of acrylonitrile polymer which can be used directly to make shaped articles which comprises polymerizing monomeric material clies which comprises polymerizing monomeric material consisting of from 50–100% by weight of acrylonitrile and up to 50% by weight of an alkyl acrylate wherein the said alkyl group contains from 1–10 carbon atoms, in N,N - dimethylformamide, at a temperature of from 20–50° C., with (1) from 0.0001–1.0% of vanadium pentoxide based on the weight of said monomeric material, and (2) from 0.025–2.0% of potassium persulfate based on the weight of said monomeric material.

10. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N - dimethylformamide, at a temperature of from 20–50° C., with (1) from 0.0001–1.0% of finely divided vanadium metal based on the weight of said monomeric material, and (2) from 0.025–2.0% of potassium persulfate based on the weight of said monomeric material.

11. A process for preparing a solution of polyacrylonitrile which can be used directly to make shaped articles which comprises polymerizing acrylonitrile in N,N - dimethylformamide, at a temperature of from 20–50° C., with (1) from 0.0001–1.0% of silver acetate based on the weight of said acrylonitrile, and (2) from 0.025–2.0% of potassium persulfate based on the weight of said acrylonitrile.

12. A process for preparing a solution of polyacrylonitrile which can be used directly to make shaped articles which comprises polymerizing acrylonitrile in N,N - dimethylformamide, at a temperature of from 20–50° C., with (1) from 0.0001–1.0% of silver nitrate based on the weight of said acrylonitrile, and (2) from 0.025–2.0% of potassium persulfate based on the weight of said acrylonitrile.

13. A process for preparing a solution of polyacrylonitrile which can be used directly to make shaped articles which comprises polymerizing acrylonitrile in N,N - dimethylformamide, at a temperature of from 20–50° C., with (1) from 0.0001–1.0% of finely divided silver metal based on the weight of said acrylonitrile, and (2) from 0.025–2.0% of potassium persulfate based on the weight of said acrylonitrile.

14. A process for preparing a solution of polyacrylonitrile which can be used directly to make shaped articles which comprises polymerizing acrylonitrile in N,N - dimethylformamide, at a temperature of from 20–50° C., with (1) from 0.0001–1.0% of vanadium pentoxide based on the weight of said acrylonitrile, and (2) from 0.025–2.0% of potassium persulfate based on the weight of said acrylonitrile.

15. A process for preparing a solution of polyacrylonitrile which can be used directly to make shaped articles which comprises polymerizing acrylonitrile in N,N - dimethylformamide, at a temperature of from 20–50° C., with (1) from 0.0001–1.0% of finely divided vanadium metal based on the weight of said acrylonitrile, and (2) from 0.025–2.0% of potassium persulfate based on the weight of said acrylonitrile.

16. A process for preparing a solution of a copolymer of acrylonitrile and methyl acrylate which can be used directly to make shaped articles which comprises polymerizing monomeric material consisting of from 70–95% by weight of acrylonitrile and from 30–5% by weight of methyl acrylate, in N,N - dimethylformamide, at a temperature of from 20–50° C., with (1) from 0.0001–1.0% of silver acetate based on the weight of said monomeric material, and (2) from 0.025–2.0% of potassium persulfate based on the weight of monomeric material.

17. A process for preparing a solution of a copolymer of acrylonitrile and methyl acrylate which can be used directly to make shaped articles which comprises polymerizing monomeric material consisting of from 70–95% by weight of acrylonitrile and from 30–5% by weight of methyl acrylate, in N,N - dimethylformamide, at a temperature of from 20–50° C., with (1) from 0.0001–1.0% of silver nitrate based on the weight of said monomeric material, and (2) from 0.025–2.0% of potassium persulfate based on the weight of monomeric material.

18. A process for preparing a solution of a copolymer of acrylonitrile and methyl acrylate which can be used directly to make shaped articles which comprises polymerizing monomeric material consisting of from 70–95% by weight of acrylonitrile and from 30–5% by weight of methyl acrylate, in N,N - dimethylformamide, at a temperature of from 20–50° C., with (1) from 0.0001–1.0% of finely divided silver metal based on the weight of said monomeric material, and from 0.025–2.0% of potassium persulfate based on the weight of monomeric material.

19. A process for preparing a solution of a copolymer of acrylonitrile and methyl acrylate which can be used directly to make shaped articles which comprises polymerizing monomeric material consisting of from 70–95% by weight of acrylonitrile and from 30–5% by weight of methyl acrylate, in N,N - dimethylformamide, at a temperature of from 20–50° C., with (1) from 0.0001–1.0% of vanadium pentoxide based on the weight of said monomeric material, and (2) from 0.025–2.0% of potassium persulfate based on the weight of monomeric material.

20. A process for preparing a solution of a copolymer of acrylonitrile and methyl acrylate which can be used directly to make shaped articles which comprises polymerizing monomeric material consisting of from 70–95% by weight of acrylonitrile and from 30–5% by weight of methyl acrylate, in N,N - dimethylformamide, at a temperature of from 20–50° C., with (1) from 0.0001–1.0% of finely divided vanadium metal based on the weight of said monomeric material, and (2) from 0.025–2.0% of potassium persulfate based on the weight of monomeric material.

21. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20 to 50° C., with (1) from 0.0001–1.0% of rhodium chloride based on the weight of said monomeric material, and (2) from 0.026–2.0% of potassium persulfate based on the weight of said monomeric material.

22. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperautre of from 20 to 50° C., with (1) from 0.0001–1.0% of rhodium nitrate based on the weight of said monomeric material, and (2) from 0.026–2.0% of potassium persulfate based on the weight of said monomeric material.

23. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in N,N-dimethylformamide, at a temperature of from 20–50° C., with (1) from 0.0001–1.0% finely divided rhodium metal based on the weight of said monomeric material, and (2) from 0.026–2.0% of potassium persulfate based on the weight of said monomeric material.

24. A process for preparing a solution of polyacrylonitrile which can be used directly to make shaped articles which comprises polymerizing acrylonitrile in N,N-dimethylformamide, at a temperature of from 20–50° C., with (1) from 0.0001–1.0% of rhodium oxide based on the weight of said acrylonitrile, and (2) from 0.025–2.0% of potassium persulfate based on the weight of said acrylonitrile.

25. A process for preparing a solution of polyacrylonitrile which can be used directly to make shaped articles which comprises polymerizing acrylonitrile in N,N-dimethylformamide, at a temperature of from 20–50° C., with (1) from 0.0001–1.0% of rhodium sulfate based on the weight of said acrylonitrile, and (2) from 0.025–2.0% of potassium persulfate based on the weight of said acrylonitrile.

26. A process for preparing a solution of acrylonitrile polymer which can be used directly to make shaped articles which comprises polymerizing monomeric material consisting of from 50–100% by weight of acrylonitrile and up to 50% by weight to make a total of 100% of at least one other monoethylenically unsaturated, polymerizable compound containing a single $CH_2=C<$ group, in an organic liquid which is a solvent for polyacrylonitrile, said liquid being comprised mainly of ethylene carbonate, at a temperature of from −70 to 100° C., with (1) from about 0.0001 to about 3.0% by weight based on monomer weight of a catalyst selected from the group consisting of silver, vanadium, rhodium and their salts and (2) from about 0.025 to about 2.0% based on monomer weight of an oxidizing agent selected from the group consisting of monoperoxysulfuric acid, peroxydisulfuric acid, ammonium salt of monoperoxysulfuric acid, ammonium salt of peroxydisulfuric acid, an alkali metal salt of monoperoxysulfuric acid, an alkali metal salt of peroxydisulfuric acid and sulfur tetroxide in combination with water.

27. A process for preparing a solution of acrylonitrile polymer which can be used directly to make shaped articles which comprises polymerizing monomer material consisting of from 50–100% by weight of acrylonitrile and up to 50% by weight to make a total of 100% of at least one other monoethylenically unsaturated, polymerizable compound containing a single $CH_2=C<$ group, in an organic liquid which is a solvent for polyacrylonitrile, said liquid being comprised of at least about 80% by volume of ethylene carbonate, at a temperature of from −70 to 100° C., with (1) from about 0.0001 to about 3.0% by weight based on monomer weight of a catalyst selected from the group consisting of silver, vanadium, rhodium and their salts and (2) from about 0.025 to about 2.0% based on monomer weight of an oxidizing agent selected from the group consisting of monoperoxysulfuric acid, peroxydisulfuric acid, ammonium salt of monoperoxysulfuric acid, ammonium salt of peroxydisulfuric acid, an alkali metal salt of monoperoxysulfuric acid, an alkali metal salt of peroxydisulfuric acid and sulfur tetroxide in combination with water.

28. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in a solvent consisting of at least about 80% by volume of ethylene carbonate, at a temperature of from 20 to 50° C., with (1) from 0.01–1.0% of silver acetate based on the weight of said monomeric material, and (2) from 0.026–2.0% of potassium persulfate based on the weight of said monomeric material.

29. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in a solvent consisting of at least about 80% by volume of ethylene carbonate, at a temperature of from 20 to 50° C., with (1) from 0.0001–1.0% of silver nitrate based on the weight of said monomeric material, and (2) from 0.026–2.0% of potassium persulfate based on the weight of said monomeric material.

30. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in a solvent consisting of at least about 80% by volume of ethylene carbonate, at a temperature of from 20 to 50° C., with (1) from 0.001–1.0% of finely divided silver metal based on the weight of said monomeric material, and (2) from 0.026–2.0% of potassium persulfate based on the weight of said monomeric material.

31. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in a solvent consisting of at least about 80% by volume of ethylene carbonate, at a temperature of from 20–50° C., with (1) from 0.0001–1.0% of vanadium pentoxide based on the weight of said monomeric material, and (2) from 0.025–2.0% of potassium persulfate based on the weight of said monomeric material.

32. A process for preparing a solution of acrylonitrile polymer which can be used directly to make shaped articles which comprises polymerizing monomeric material consisting of from 50–100% by weight of acrylonitrile and up to 50% by weight of an alkyl acrylate wherein the said alkyl group contains from 1–10 carbon atoms, in a solvent consisting of at least about 80% by volume of ethylene carbonate, at a temperature of from 20–50° C., with (1) from 0.0001–1.0% of finely divided vanadium metal based on the weight of said monomeric material, and (2) from 0.025–2.0% of potassium persulfate based on the weight of said monomeric material.

References Cited

UNITED STATES PATENTS

| | | | |
|---|---|---|---|
| 2,473,549 | 6/1949 | Smith | 260—88.7 |
| 2,768,148 | 10/1956 | Schildknecht et al. | 260—88.7 |
| 2,794,793 | 6/1957 | Coover | 260—88.7 |
| 2,858,290 | 10/1958 | Davis et al. | 260—30.8 |
| 3,020,265 | 2/1962 | Tietz | 260—88.7 |
| 3,060,157 | 10/1962 | Goodman et al. | 260—85.5 |
| 3,069,402 | 12/1962 | Smart | 260—85.5 |

FOREIGN PATENTS 1,076,372  2/1960  Germany.

JOSEPH L. SCHOFER, *Primary Examiner.*

J. A. SEIDLECK, *Examiner.*

H. WONG, *Assistant Examiner.*